United States Patent
Kurtz et al.

(10) Patent No.: US 9,739,677 B2
(45) Date of Patent: *Aug. 22, 2017

(54) MATCHING BACK PRESSURES ON DIFFERENTIAL OIL-FILLED DIAPHRAGMS

(71) Applicants: Nora D. Kurtz, Saddle River, NJ (US); Kulite Semiconductor Products, Inc., Leonia, NJ (US)

(72) Inventors: Anthony D. Kurtz, Saddle River, NJ (US); Lou DeRosa, Wayne, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 251 days.

This patent is subject to a terminal disclaimer.

(21) Appl. No.: 14/683,537

(22) Filed: Apr. 10, 2015

(65) Prior Publication Data

US 2015/0211948 A1  Jul. 30, 2015

Related U.S. Application Data

(63) Continuation of application No. 13/720,414, filed on Dec. 19, 2012, now Pat. No. 9,027,409.

(51) Int. Cl.
| | |
|---|---|
| G01L 9/06 | (2006.01) |
| G01L 9/00 | (2006.01) |
| G01L 13/02 | (2006.01) |
| G01L 19/04 | (2006.01) |

(52) U.S. Cl.
CPC .......... *G01L 9/0052* (2013.01); *G01L 9/0055* (2013.01); *G01L 13/025* (2013.01); *G01L 19/04* (2013.01)

(58) Field of Classification Search
None
See application file for complete search history.

(56) References Cited

U.S. PATENT DOCUMENTS

| | | | | |
|---|---|---|---|---|
| 4,662,213 | A * | 5/1987 | Handy | G01N 33/24 73/37 |
| 9,027,409 | B2 * | 5/2015 | Kurtz | G01L 9/0052 73/716 |
| 2002/0146607 | A1 * | 10/2002 | Kai | F16K 25/00 429/444 |
| 2009/0205433 | A1 | 8/2009 | Kurtz | |
| 2009/0205434 | A1 | 8/2009 | Kurtz | |
| 2010/0326199 | A1 | 12/2010 | Kurtz et al. | |
| 2014/0053652 | A1 | 2/2014 | Kurtz | |

* cited by examiner

*Primary Examiner* — Andre Allen
(74) *Attorney, Agent, or Firm* — Troutman Sanders LLP; James E. Schutz; Mark Lehi Jones

(57) ABSTRACT

Exemplary embodiments of the present invention provide a differential pressure transducer that comprises first and second diaphragms of different configurations, i.e., different diameters and/or thicknesses. The pressure transducer provides more versatility over prior art designs as the diaphragms can be of different configurations yet still maintain substantially similar back pressures. Therefore, the errors commonly associated with back pressures are eliminated because the back pressures from the diaphragms ultimately cancel out in the sensor's differential pressure measurement.

20 Claims, 2 Drawing Sheets

MATCHING BACK PRESSURES ON DIFFERENTIAL OIL-FILLED DIAPHRAGMS

RELATED APPLICATIONS

This application is a Continuation of U.S. patent application Ser. No. 13/720,414 entitled "Matching Back Pressures on Differential Oil-Filled Diaphragms," filed 19 Dec. 2012, and published as U.S. Patent Application Publication No. US2014/0165735 on 19 Jun. 2014, the contents of which are incorporated by reference in their entirety as if fully set forth herein.

TECHNICAL FIELD

This invention relates to pressure transducers and more particularly to a low differential pressure transducer and header.

BACKGROUND

A differential pressure transducer is a device that provides an output indicative of a difference between two input pressures. For example, when a first pressure $P_1$ is applied to one face of a deflecting diaphragm and a second pressure $P_2$ is applied to the other face of the deflecting diaphragm the resulting deflection of the diaphragm will be determined by the difference in pressure (as for example $P_1$-$P_2$). There are other differential pressure transducers in the prior art that essentially use two separate semiconductor structures. Each structure has its own diaphragm and the piezoresistors employed on the diaphragm surfaces are connected together to form a bridge which provides a differential output.

A pressure sensor of a differential pressure transducer is often enclosed inside an oil filled capsule to protect the sensor from harsh environments. One drawback of this encapsulation is that as the temperature changes, the oil expands and contracts and creates an additional pressure on the sensor. Thus, as the oil expands the metal isolation diaphragm must deflect slightly in order to make room for the extra volume of oil. This deflection causes the metal diaphragm to impart a small pressure (a "back pressure") into the oil which is then transmitted to the sensor. This pressure is generally on the order of a few PSI for every 100° F. change in temperature but can vary a great deal depending on the volume of oil and the stiffness of the metal diaphragm. For most pressure sensors this additional pressure is relatively small compared to other errors and can be electrically corrected in a number of different ways.

However, when the sensor is a relatively low pressure sensing device, it is more difficult to correct these errors, and extra effort must be made to eliminate the cause of this undesirable back pressure. This is also true in high heat environments or with fluctuating temperature environments. These challenges generally occur within differential pressure sensors where both the main and reference ports of the transducer are oil-filled. One solution to this problem is to make the two oil filled pressure capsules identical in configuration such that the pressure on the front and back of the sensor cancel out (as disclosed in U.S. Pat. No. 7,743,662, herein incorporated by reference), which is not always possible due to geometric considerations. It is to this need that the present invention is directed.

BRIEF SUMMARY

Exemplary embodiments provide a pressure transducer, comprising: a first diaphragm housed in a first section of a header, the first diaphragm having a first diameter and being adapted to receive a first pressure; a second diaphragm housed in a second section of the header, the second diaphragm having a second diameter and being adapted to receive a second pressure, wherein the first diameter and the second diameter are different; and a sensor module in communication with the first diaphragm and the second diaphragm via first and second oil-filled volumes, respectively, adapted to output a signal substantially indicative of a difference between the first and second pressures; wherein the first diaphragm receives a first back pressure from the first oil-filled volume and the second diaphragm receives a second back pressure from the second oil-filled volume, wherein the first back pressure and the second back pressure are substantially similar.

Other exemplary embodiments provide a pressure transducer, comprising: a first diaphragm having a first diameter housed in a first section of a header, the first diaphragm adapted to receive a first pressure and deflect indicative of the first pressure; a first oil-filled volume defined on a backside of the first diaphragm, the first oil-filled volume adapted to transmit the deflection of the first diaphragm to a sensor module, and wherein the first diaphragm receives a first back pressure from the first oil-filled volume; a second diaphragm having a second diameter housed in a second section of the header, the second diaphragm adapted to receive a second pressure and deflect indicative of the first pressure; and a second oil-filled volume defined on a backside of the second diaphragm, the second oil-filled volume adapted to transmit the deflection of the second diaphragm to the sensor module via a channel housed in a middle section of the header, and wherein the second diaphragm receives a second back pressure from the second oil-filled volume; wherein the first diameter and the second diameter are different; and wherein the first back pressure and second back pressure are substantially the same.

DETAILED DESCRIPTION

Figure 1:
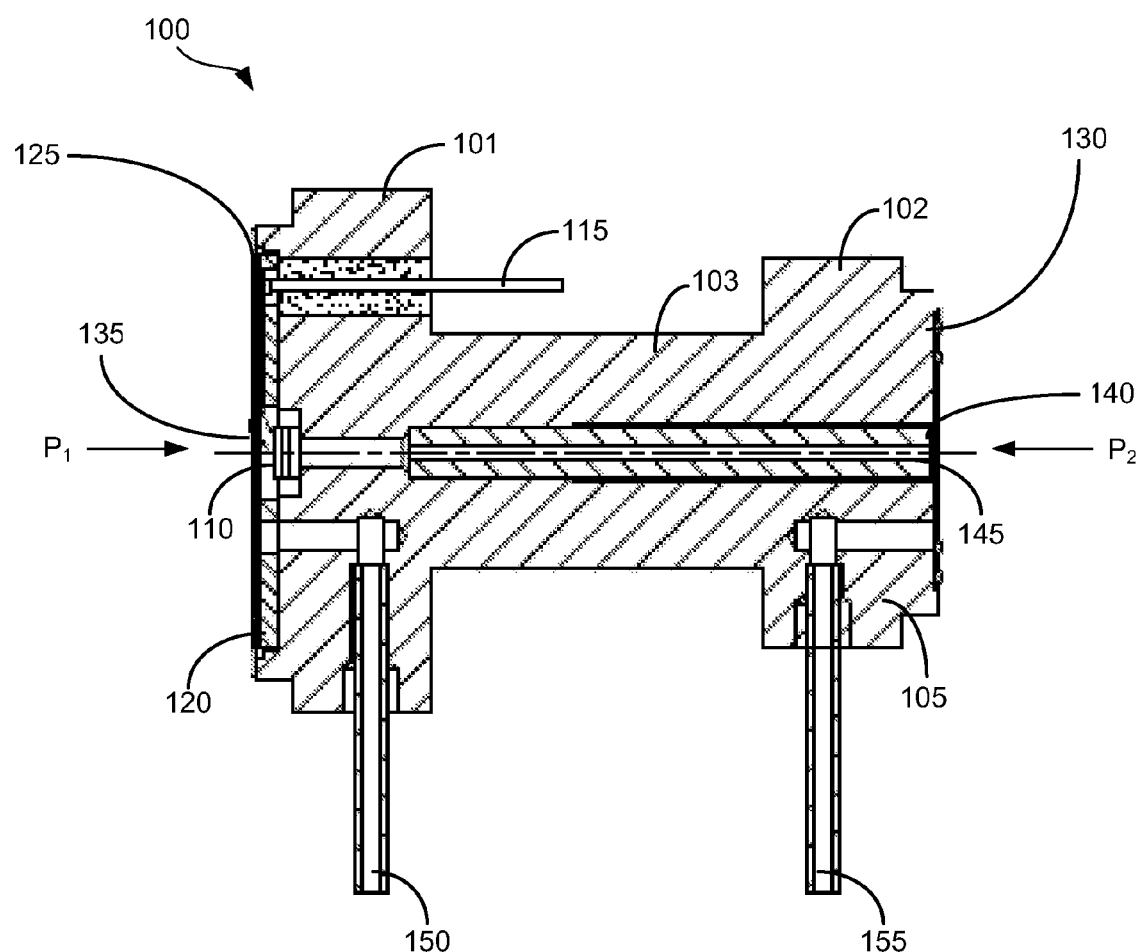
FIG. 1 illustrates an exemplary embodiment of a pressure transducer according to the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure sensor assemblies and chip-package assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide a differential pressure transducer that comprises first and second diaphragms of different configurations, i.e., different diameters and/or thicknesses. The pressure transducer provides more versatility over prior art designs as the diaphragms can be of different configurations yet still maintain substantially similar back pressures. Therefore, the errors commonly associated with back pressures are eliminated because the back pressures from the diaphragms ultimately cancel out in the sensor's differential pressure measurement, as will be further explained herein.

In many prior art configurations, such as those disclosed in U.S. Pat. Nos. 7,743,662, 7,866,216, and 8,191,424, also assigned to the assignee herein and incorporated by reference herein, the diaphragms are made to be of substantially the same configuration (i.e., same diaphragm and thickness) to compensate and cancel out undesirable back pressure caused by oil-filled regions, which will be further discussed herein. The various exemplary embodiments, however, eliminate the need for diaphragms to be of substantially the same configuration, yet also compensate and cancel out undesirable back pressure effects, allowing for enhanced design flexibility.

Referring to FIG. 1, there is shown an exemplary embodiment of a pressure transducer 100. The pressure transducer 100 generally comprises a substantially dumbbell-shaped header 105 fabricated from a metal material (other materials may be used, however). The header 105 generally houses the elements of the pressure transducer, and comprises a first section 101, a second section 102, and a middle section 103. The transducer 100 comprises a sensor module 110 housed in the first section 101 of the header 105. The sensor module 110 is associated with wire-bonded leads 115. Further, there is shown a ceramic layer 120 that defines a central aperture that surrounds the sensor module 110 and displaces some of the oil volume so that there is less oil to create a back pressure.

The pressure transducer 100 comprises a first diaphragm 125 disposed adjacent the first section 101 of the header 105 and a second diaphragm 130 disposed adjacent the second section 102 of the header 105. The first diaphragm 125 and the second diaphragm 130 are preferably fabricated from a metal material, but may be made from other materials as well. The first diaphragm 125 receives a first pressure, $P_1$, from a first pressure port in communication with a first pressure source and the second diaphragm 130 receives a second pressure, $P_2$, from a second pressure port in communication with a second pressure source. As one skilled in the art will appreciate, each diaphragm is configured to deflect proportional to the amount of pressure applied to the diaphragm. This deflection of the first diaphragm 125 and the second diaphragm 130 are then transferred to opposite sides of the sensor module 110, and the sensor module 110 provides an output proportional to the difference between pressures $P_1$ and $P_2$. For the deflection of the first diaphragm 125 and the second diaphragm 130 to be accurately transferred to the sensor module 110, first and second oil-filled volumes are utilized. A first oil-filled volume 135 is disposed between a backside of the first diaphragm 125 and the ceramic layer 125. A second oil-filled volume 140 is disposed adjacent a backside of the second diaphragm 125 and flows through a channel 145 to reach the sensor module 110. The oil for the first oil-filled volume 135 and second oil-filled volume 140 is provided via first and second oil-filled tubes 150/155, respectively. One drawback to the oil-filled volumes 135/140 is that as the temperature changes, the oil in the oil-filled volumes expands and contracts, therefore creating an additional pressure on the sensor module 110. Thus, as the oil expands and contracts, the first and second diaphragms 125/130 must slightly deflect to make room for the extra volume of oil. This deflection causes the first and second diaphragms 125/130 to impart a small pressure, known as a "back pressure," into the oil, which is then transmitted to the sensor 125/130. Therefore, if both the first and second diaphragms 125/130 have the same amount of back pressure, the back pressures will cancel each other out in a differential pressure measurement. Prior art embodiments therefore utilized first and second diaphragms of substantially the same configuration—i.e., substantially the same size, diameter, and thickness to combat this problem. It was previously thought that this was the only design that would result in a more uniform operation of the transducer because the diaphragms would have the same back pressure, which would therefore cancel out in the differential pressure measurement and be similarly compliant.

However, the present invention may comprise first and second diaphragms of different configurations and still maintain uniform thermal back pressures that cancel out in a differential pressure measurement. By adjusting the amount of oil as well as the diameter and thickness of the diaphragms, it is possible to make first and second oil-filled volumes that apply substantially similar thermal back pressure.

The deflection of a thin diaphragm under a uniform pressure is given by:

$$y_c \approx \frac{Pr^4}{Et^3}$$

Where $y_c$ is the deflection at the center of the diaphragm, P is the pressure on the diaphragm, r is the radius, E is the Young's Modulus, and t is the thickness. The expansion of the oil is given by $$\Delta V \approx VT\beta$$

Where $\Delta V$ is the change in volume, V is the original volume, T is the temperature, and $\beta$ is the volumetric expansion coefficient of the oil. By assuming the oil is essentially a cylinder directly underneath the diaphragm, the equation can be rewritten as:

$$\Delta V \approx r^2 hT\beta$$

Where h is the height of the oil.

By integrating the displacement of the diaphragm over its surface and solving for the pressure, the pressure created when the diaphragm is displaced may be found, which allows room for the expanded oil volume. The formula for oil expansion can then be plugged in to get an equation for pressure as a function of temperature:

$$P \approx \frac{\beta h T E t^3}{r^4}$$

From this equation, given two different diameters, it is possible to find a combination of oil-filled volume and diaphragm thickness that will cause the back pressure to cancel out. It is also possible to stiffen the diaphragm in other ways such as adding convolutions rather than increasing the thickness.

Therefore, the pressure transducer 100 of the present invention comprises a first diaphragm 125 and a second diaphragm 130 of different diameters and/or thicknesses, yet still maintain substantially similar back pressures such that the back pressures cancel each other out in a differential pressure measurement performed by the sensor module 110. This pressure transducer configuration enables more versatility in diaphragm design.

It shall also be understood that exemplary embodiments of the pressure transducer 100 are not limited to the first and second diaphragm being of different diameters and/or thicknesses. For example, embodiments of the pressure transducer 100 may comprise first and second diaphragms 125/130 of substantially the same configuration (i.e., having the same diameter and thickness). In these embodiments, other components, for example, the first and second oil-filled volumes 135/140, may be manipulated to be of different configurations, while still maintaining substantially similar back pressures.

Figure 2:
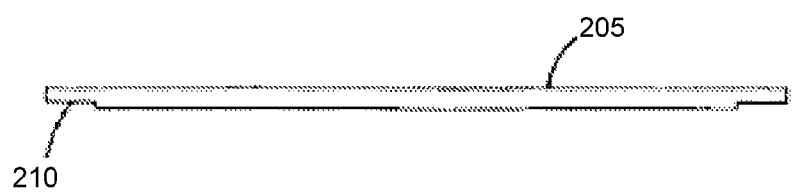
FIG. 2 is a cross-sectional view of a diaphragm according to an aspect of the present invention.

Referring to FIG. 2, there is shown a cross-sectional view of a typical diaphragm 205, which is the type of diaphragm employed in FIG. 1 as first and second diaphragms 125/130. The diaphragm 205 is preferably thin and preferably made of metal and further, has a peripheral flange 210 to securely position the diaphragm onto the header 105.

Figure 3:
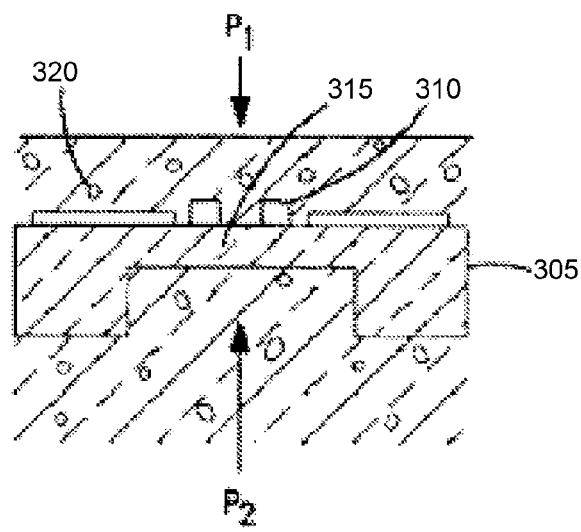
FIG. 3 is a cross-sectional view of a pressure sensor employing piezoresistors according to an aspect of the present invention.

Referring to FIG. 3, there is shown a schematic cross-sectional view of a typical sensor module. The sensor module comprises a semiconductor substrate 305 having a thin active area or diaphragm 315 upon which piezoresistors 310 are positioned. The sensor can be protected from external environments by coating it with a layer of silicon dioxide. Pressure $P_1$ is applied to the top of the sensor active area or diaphragm 315. Pressure $P_1$ is transmitted to the sensor by the oil 320, which fills the cavity above the sensor. Pressure $P_2$ is applied to the underside of the sensor diaphragm via channel 145. Therefore, the sensor produces an output pressure indicative of the differential pressure between $P_1$ and $P_2$.

Figure 4:
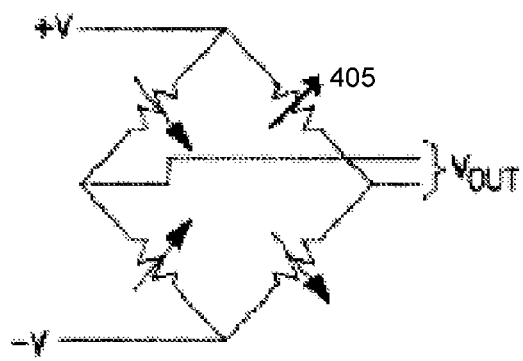
FIG. 4 is a schematic diaphragm of Wheatstone Bridge such as the type employed on the sensor of FIG. 3 and used in explaining the present invention.

FIG. 4 illustrates a Wheatstone Bridge configuration having four resistors 405, which may be piezoresistors. One skilled in the art will appreciate that the resistance of the resistors 405 change according to an applied pressure. Also illustrated in FIG. 4 are four leads associated with the Wheatstone Bridge, two of the leads bias the bridge and two provide an output. In prior art embodiments, five leads were generally utilized so that one lead could perform as a separate ground reference lead. Irrespective of the number of leads utilized for the bridge, each lead must be brought out from the device. The various embodiments of the present invention may be desirable over the prior art because each embodiment enables the leads to be brought out and allows the back pressures from the oil-filled volumes to cancel out without the need for substantially similar diaphragm configurations. This configuration results in improved operation of differential pressure transducers as compared to prior art devices.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

The invention claimed is:

1. A pressure transducer, comprising:
    a first diaphragm housed in a first section of a header, the first diaphragm having a first stiffness and being adapted to receive a first pressure;
    a second diaphragm housed in a second section of the header, the second diaphragm having a second stiffness and being adapted to receive a second pressure, wherein the first stiffness and the second stiffness are different; and
    a sensor module in communication with the first diaphragm and the second diaphragm via first and second oil-filled volumes, respectively, the sensor module adapted to output a signal indicating a difference between the first and second pressures;
    wherein the first diaphragm receives a first back pressure from the first oil-filled volume and the second diaphragm receives a second back pressure from the second oil-filled volume.

2. The pressure transducer of claim 1, wherein the first diaphragm and the second diaphragm are of different diameters.

3. The pressure transducer of claim 1, wherein the first diaphragm and the second diaphragm are of different thicknesses.

4. The pressure transducer of claim 1, wherein one of the first diaphragm or the second diaphragm comprises a different convolution to impart a different stiffness relative to a corresponding second diaphragm or first diaphragm.

5. The pressure transducer of claim 4, wherein the first diaphragm and the second diaphragm are of equivalent thicknesses.

6. The pressure transducer of claim 1, wherein the sensor module is a piezoresistive sensor.

7. The pressure transducer of claim 6, wherein the sensor module comprises a Wheatstone bridge including at least one piezoresistor.

8. A pressure transducer, comprising:
- a first diaphragm having a first stiffness housed in a first section of a header, the first diaphragm adapted to receive a first pressure and deflect indicative of the first pressure;
- a first oil-filled volume defined on a backside of the first diaphragm, the first oil-filled volume adapted to transmit the deflection of the first diaphragm to a sensor module, and wherein the first diaphragm receives a first back pressure from the first oil-filled volume;
- a second diaphragm having a second stiffness housed in a second section of the header, the second diaphragm adapted to receive a second pressure and deflect indicative of the first pressure; and
- a second oil-filled volume defined on a backside of the second diaphragm, the second oil-filled volume adapted to transmit the deflection of the second diaphragm to the sensor module via an oil-filled channel housed in a middle section of the header, and wherein the second diaphragm receives a second back pressure from the second oil-filled volume; and
- wherein the first stiffness and the second stiffness are different.

9. The pressure transducer of claim 8, wherein deflection of the first and second diaphragms is determined by:

$$y_c \approx \frac{Pr^4}{Et^3}$$

where $y_c$ is deflection at the center of the diaphragms, P is the pressure on the diaphragms, r is the radius of the diaphragms, E is Young's Modulus, and t is diaphragm thickness.

10. The pressure transducer of claim 8, wherein expansion of oil in the first and second oil-filled volumes is determined by:

$$\Delta V \approx VT\beta$$

where $\Delta V$ is the change in volume, V is the original volume, T is the temperature, and $\beta$ is the volumetric expansion coefficient of the oil.

11. The pressure transducer of claim 8, wherein the sensor module is adapted to output a signal indicative of a difference between the first and second pressures.

12. The pressure transducer of claim 8, wherein the first diaphragm and the second diaphragm are of different thicknesses.

13. The pressure transducer of claim 8, wherein the first diaphragm and the second diaphragm are of different diameters.

14. The pressure transducer of claim 8, wherein the first diaphragm and the second diaphragm are of different thicknesses.

15. The pressure transducer of claim 8, wherein one of the first diaphragm or the second diaphragm comprises a different convolution to impart a different stiffness relative to a corresponding second diaphragm or first diaphragm.

16. The pressure transducer of claim 15, wherein the first diaphragm and the second diaphragm are of equivalent thicknesses.

17. The pressure transducer of claim 8, wherein the first diaphragm and the second diaphragm are fabricated from a metal.

18. The pressure transducer of claim 8, wherein the header is fabricated from a metal.

19. The pressure transducer of claim 8, wherein the sensor module comprises a Wheatstone bridge including at least one piezoresistor located thereon.

20. A pressure transducer, comprising:
- a first diaphragm having a first stiffness and housed in a first section of a header, the first diaphragm adapted to receive a first pressure and deflect indicative of the first pressure;
- a first oil-filled volume of a first configuration defined on a backside of the first diaphragm, the first oil-filled volume adapted to transmit the deflection of the first diaphragm to a sensor module, and wherein the first diaphragm receives a first back pressure from the first oil-filled volume;
- a second diaphragm having a second stiffness and housed in a second section of the header, the second diaphragm adapted to receive a second pressure and deflect indicative of the second pressure; and
- a second oil-filled volume of a second configuration defined on a backside of the second diaphragm, the second oil-filled volume adapted to transmit the deflection of the second diaphragm to the sensor module via a channel housed in a middle section of the header, and wherein the second diaphragm receives a second back pressure from the second oil-filled volume;
- wherein the first configuration and the second configuration are different.

* * * * *